G. C. WING & F. W. HEMPY.
STREET CAR AND SIMILAR VEHICLE.
APPLICATION FILED OCT. 7, 1909.
953,502.
Patented Mar. 29, 1910.
3 SHEETS—SHEET 2.
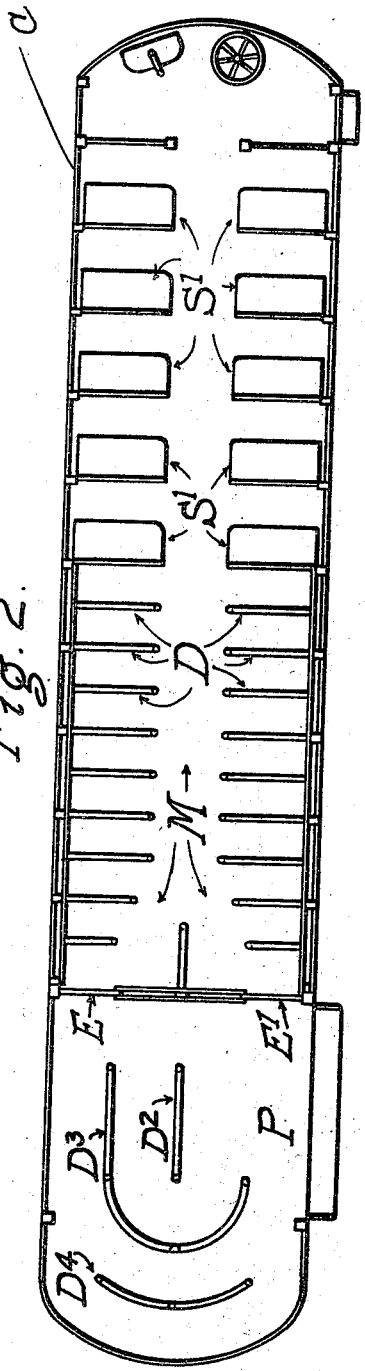
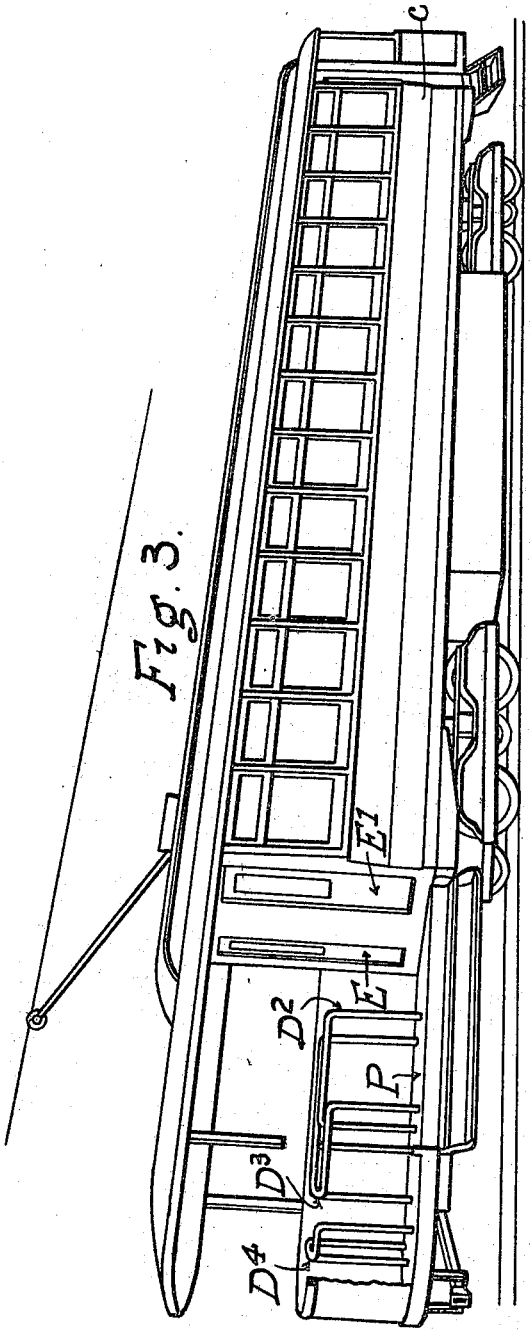

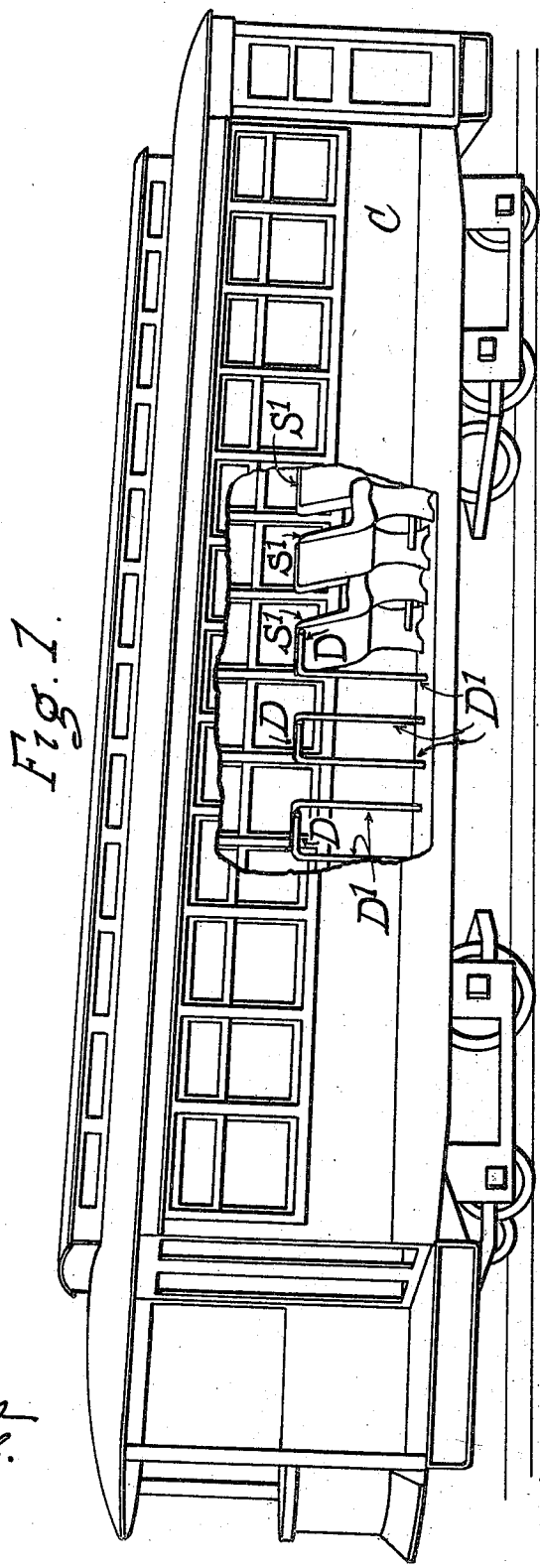

G. C. WING & F. W. HEMPY.
STREET CAR AND SIMILAR VEHICLE.
APPLICATION FILED OCT. 7, 1909.
953,502.
Patented Mar. 29, 1910.
3 SHEETS—SHEET 3.
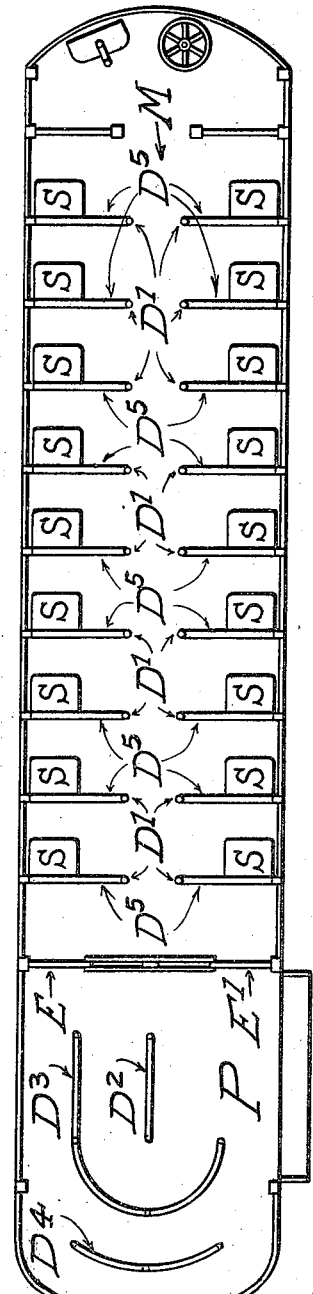
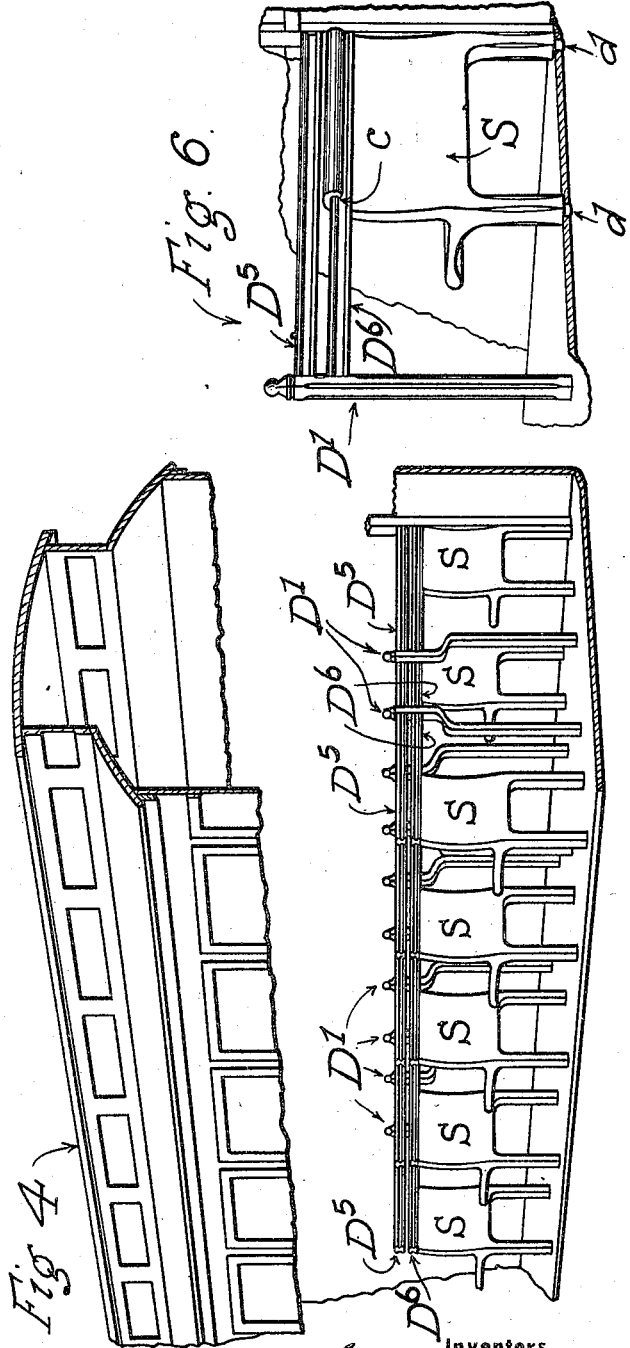

UNITED STATES PATENT OFFICE.

GEORGE C. WING AND FREDERICK W. HEMPY, OF CLEVELAND, OHIO, ASSIGNORS TO GEORGE C. WING, TRUSTEE, OF CLEVELAND, OHIO.

STREET-CAR AND SIMILAR VEHICLE.

953,502.  Specification of Letters Patent.  Patented Mar. 29, 1910.

Application filed October 7, 1909. Serial No. 521,606.

*To all whom it may concern:*

Be it known that we, GEORGE C. WING and FREDERICK W. HEMPY, both citizens of the United States, residing at the city of Cleveland, in the county of Cuyahoga and State of Ohio, have invented a new and useful Improvement in Street-Cars and Similar Vehicles, as to which we hereby declare the following to be a full, clear, and exact description, reference being had to the several drawings accompanying and a part of these specifications, wherein similar letters denote similar parts in each case.

While our invention, in general, relates to any form of vehicle for the transportation of passengers, its chief application and use has relation to car-service on surface, sub-surface, or supersurface roads in and about the larger popular centers. Here over-congestion is sure to occur, and is to be relieved, either occasionally, as to and from theaters, ball-games and other exhibition points and attractions, or, regularly, each day, as during the so-called rush hours at the opening and closing of business. At these times the promptness and speed with which passengers are handled is practically the chief concern and although a careful census shows that, in Chicago alone, during the year 1908, close to 50,000,000 passengers were carried in more or less upright positions, they were thus carried in cars whose internal equipment—aside from the familiar aisle-straps—in no manner recognized this large standing majority among car riders. The external arrangements of modern cars, however, the pay-enter apparatus and deck-like or veranda-platforms do assume, what is well understood by every one who boards a car during "rush hours", namely, that, as a fact, a main use of a car, nowadays, is when there is standing room only thereon, and when the mass of its standing freight is too dense for even the conductor to penetrate. Nevertheless car-designers and car-buyers practically ignore and fail to meet this fact and condition but, assuming that the first use of the floor space is for seats, appropriate the whole of this space accordingly, and, at the same time make substantially no provision for those who, either from preference, in view of all the circumstances, or from necessity, are in any event, to stand during their ride.

It is the purpose and object of this invention to recognize and, to a useful extent, meet the situation above referred to, by providing a combination street car, or similar vehicle that somewhat more justly minimizes or proportions the share of room to be occupied by seats, and, at the same time, so arranges the space to be occupied by the standing passengers that the latter shall be not only supported in places once gained but protected therein against the crowding and intrusion of their neighbors. The idea embraces the further merit of enabling transportation companies to move larger masses with fewer vehicles and at a consequent less outlay for plant, and this without imposing on car-riders any other or different conditions than what they have long since shown themselves willing to accept.

In the several drawings Figure 1 is a perspective partly broken away, of a combination-street car, arranged according to our invention. Fig. 2 is a plan view of the arrangement applied to the car proper, and also a rear-platform equipped with our divisional support system; and Fig. 3 is a broken perspective of a car and platform of the kind denoted in Fig. 2. Fig. 4 is a partial interior perspective view of a car equipped with a special form or adaptation of our invention. Fig. 5 is a plan view of a car thus equipped, and, Fig. 6 illustrates a method of combining portable seats with the transverse supports described.

C is a street car of the usual type save in the special details hereinafter pointed out.
As applied to the same in the particular manner set out in the drawings, the invention consists, in the first instance, in the arrangement, on the opposite sides of the central aisle, of a series of rigid balustrade-like handrests or supports, that extend at intervals from and transversely of the sides of the car, with seatless spaces between the members of the series for the accommodation of standing passengers therein. In the figures these supports are made up of a horizontal hand-rail D, firmly affixed to the side of the car, at one end, at a convenient height from the floor to be grasped by a passenger when standing, and joined to and sustained at the other, or aisle-end, by upright balusters or posts D'. The latter are rigidly fastened to the floor at their lower ends and, preferably, may be made to curve or recede inwardly from their upper ends, as shown in Fig. 4, or indeed, under some conditions, may be omitted entirely. The intervals, or spaces, between the several divisional members of the series referred to, may be as desired; except that they should never be so wide that a passenger cannot reach and grasp one of said supports when standing between the same. Said intervals, doubtless, will usually be of a suitable width to comfortably accommodate two people when standing in line with each other across the same, and also when standing side by side against the rails, transversely of the car. By this arrangement, as will be manifest, not only is a firm support provided for standing passengers throughout such portion of a car as is not provided with seats, but also, as is of equal importance, the mass or body of such passengers is thereby divided up into small units, and the individuals composing each unit severally protected in their places against the crowding or interference of other passengers.

The chief remaining feature of the invention consists in apportioning off and providing the rest of the car's floor space with suitable seats S', so that the combined arrangement of seats and seatless spaces, above described, shall together best fit the vehicle for the varying passenger traffic it is to serve. It is evident that the desired coaction between said seat and seatless portions of a car is more likely to be realized, in many instances, by taking into consideration the estimated or proved demand for seats which a car will be called on to supply under average or normal conditions, and, then, regarding all of the floor space, that is fairly in excess of this demand as available for fitting up for standing passengers alone who are to be the additional and chief patrons of the car during rush-hours, and under like abnormal or emergency conditions.

It is to be observed that our combination car is not to be understood as only represented and embodied in the precise constructions indicated in the drawings. It equally extends to and covers an arrangement of seats wherever located in the car, when said supports are also located, as tributary or ancillary thereto, in another part, whether this latter point be immediately adjacent to a seat or seats on the opposite side of the car, at the front, the rear, or at several different points therein.

A special adaptation of our idea, illustrated in Figs. 4 and 5, is particularly meritorious in the distribution it effects of the seats and supports, and, is accordingly made the subject of a specific claim herein. It consists in having single seats S, instead of the usual double seats, arranged, in tandem, with respect to each other along the sides of the car next to the windows, and beneath that portion of the roof which, in prevailing designs, is lower than nearer the center of the car, and in using the space that would ordinarily be occupied by the aisle-end of a double seat for the accommodation of standing passengers. In this arrangement said hand-rails or supports, marked $D^5$ and $D^6$ respectively, extend to the side of the car, or to the adjacent seat, and in a line with the back of the latter. A car laid out in this special manner, besides utilizing the higher portions therefor for standing passengers, is more uniform in structure, better ventilated, and more equably disposes the chances of obtaining a seat than in the other arrangements referred to.

Another special manner of utilizing our said idea is indicated in Fig. 6, wherein the seats, either single or double, are made adjustable in their places in relatio. to the supports, so that such seats may be removed from, or returned to their several locations, as occasion requires. Obviously, there are many variations of the details of accomplishing this portability, and that shown in Fig. 6 is intended to indicate one possible mode. As will be noted in this case, the seat-legs are provided at their lower ends with tenons or pivot-like projections $d$, to fit into corresponding holes in the floor of the car, and the seat itself, is curved backwardly along the top, as indicated by $c$, and given a suitable height to be hooked over or hung, by said curve, from one of the supports, as $D^6$, when said tenons $d$ are in their holes, and, in this manner, to be firmly held in place.

A knowledge of general requirements, as affected by the circumstances of each particular case, will greatly assist in arriving at the best distribution of the two constructive features described above, as well as the relative proportions and capacities they should have.

The division and support of the mass of passengers—as above explained—being a controlling principle of the invention, when broadly considered, it is plain that its application will have a large degree of utility independent of the presence of seats in a given car or vehicle, and, we therefore add suitable claims founded on this feature alone. Where there is a large crowd to be speedily moved, a short haul, or other appropriate conditions, the seats S' may be removed or omitted entirely, and the transverse rests or divisional members D used over the entire floor space.

As a further adjunct to, or specialized form of the crowd-carrying medium in question, the drawings represent a car provided with an extended platform P, across which, centrally, are ranged one or more hand-rests or divisional supports $D^2$ $D^3$ and $D^4$, each made up of a rail and posts, and similar in general character and with corresponding functions to the supports within the car already described. Whether one or more of these supports are employed, they may each be given any shape or form, or be located with relation to the floor of the platform, or to each other, in any manner desired so that they shall serve the double office of at the same time dividing up the platform crowd as a whole, and supporting each member of the same individually. As before remarked modern car-managements, to a certain extent, recognize a willingness on the part of the riding public to stand *en route*, and take advantage of this disposition by enlarging that portion of the car that in no way is associated with seats; they have, however, never provided or devised any facilities thereon for steadying the patrons of this portion of the vehicle in their occupancy of the same, and a car, therefore, that combines this sort of a platform with its other accommodations has manifest advantages over existing instruments of its kind. The usual entrance and exit doors between the car and platform are designated, respectively, by E and E'.

Having thus described our invention, and specific embodiments thereof, what we claim and desire to secure by Letters Patent is:—

1. A street-car or similar vehicle having handrests with seatless spaces between the same at one part thereof, and one or more seats at another part, said handrests being at suitable distances one from the other to enable passengers to stand at any point within said intervening spaces and grasp said handrests, substantially as shown and described.

2. A street-car or similar vehicle having transverse handrests with seatless spaces between the same at one part thereof, and one or more seats at another part, said handrests being at suitable distances one from the other to enable passengers to stand at any point between the same and grasp said handrests substantially as shown and described.

3. A street-car or similar vehicle having transverse handrests with seatless spaces between the same at one part thereof, and transverse seats at another part, said handrests being at suitable distances one from the other to enable passengers to stand at any point within the intervening seatless spaces, and grasp said handrests, substantially as shown and described.

4. A street-car or similar vehicle having transverse handrests with seatless spaces between the same within and near the forward end of said vehicle, and seats in the remaining portion thereof, the said handrests being at suitable distances one from the other to enable passengers to stand at any point within the intervening seatless spaces, and grasp said handrests, substantially as shown and described.

5. A street-car or similar vehicle having transverse handrests with seatless spaces between the same within and near the rear end of said vehicle, and seats in the remaining portion thereof, the said handrests being at suitable distances one from the other, to enable passengers to stand at any point within the intervening seatless spaces and grasp said handrests, substantially as shown and described.

6. A street-car, or similar vehicle having a series of transverse handrests with seatless spaces between the same centrally located in said vehicle, and seats in other portions thereof, the said handrests being at suitable distances one from the other to enable passengers to stand at any point of the seatless spaces between and grasp said handrests, substantially as shown and described.

7. A street-car or similar vehicle having seats arranged at the side or sides thereof, and hand-rests extending transversely from an aisle or common passage-way in said car toward said seats, with seatless spaces along said hand-rests for the accommodation of standing passengers, substantially as shown and described.

8. In a street-car or similar vehicle the combination of a series of parallel transverse hand-rests or supports, and removable seats in the spaces between said hand-rests or supports, together with suitable means of securing said seats in their said places, substantially as shown and described.

9. A street-car or similar vehicle provided with a platform having a handrest or handrests, with seatless spaces on each side of the same for the accommodation of standing passengers, the said handrests and spaces being located exteriorly of the main or direct passageways on said platform to or from said vehicle, substantially as shown and described.

10. A street car or similar vehicle having transverse handrests with seatless spaces between the same, said handrests being at suitable distances one from the other to enable passengers to stand at any point within the intervening seatless spaces and grasp said handrests substantially as shown and described.

11. A street car or similar vehicle having transverse handrests throughout the floor-space thereof with seatless spaces between the same for the accommodation of standing passengers, said handrests being at suitable distances one from the other to enable passengers to stand at any point within the intervening seatless spaces and grasp said handrests substantially as shown and described.

GEORGE C. WING.
FREDERICK W. HEMPY.

In presence of—
  W. J. O'NEILL,
  F. SINGLETON.